United States Patent
Delahaye et al.

(10) Patent No.: US 9,688,382 B2
(45) Date of Patent: Jun. 27, 2017

(54) METHOD OF CONSTRUCTING A FIXED-WING AIRCRAFT

(75) Inventors: Romain Delahaye, Colomiers (FR); Guillaume Gallant, Lareole (FR)

(73) Assignee: AIRBUS OPERATIONS (S.A.S.), Toulouse (FR)

( * ) Notice: Subject to any disclaimer, the term of this patent is extended or adjusted under 35 U.S.C. 154(b) by 323 days.

(21) Appl. No.: 12/833,319

(22) Filed: Jul. 9, 2010

(65) Prior Publication Data

US 2011/0147521 A1    Jun. 23, 2011

(30) Foreign Application Priority Data

Jul. 16, 2009   (FR) ...................................... 09 54918

(51) Int. Cl.
*B64C 1/26*     (2006.01)
*B64F 5/10*     (2017.01)
*B64C 1/00*     (2006.01)

(52) U.S. Cl.
CPC .................. *B64C 1/26* (2013.01); *B64F 5/10* (2017.01); *B64C 2001/0072* (2013.01); *Y02T 50/433* (2013.01); *Y10T 29/49947* (2015.01)

(58) Field of Classification Search
USPC .................. 244/119, 120, 130, 131, 132, 1 R
See application file for complete search history.

(56) References Cited

U.S. PATENT DOCUMENTS

| | | | |
|---|---|---|---|
| 1,865,964 A * | 7/1932 | Rohrbach | 244/45 R |
| 3,499,622 A | 3/1970 | Lugan | |
| 4,591,114 A * | 5/1986 | Block | 244/120 |
| 4,915,665 A * | 4/1990 | Ming | 446/66 |
| 8,133,089 B2 * | 3/2012 | Amireh et al. | 446/58 |
| 2009/0146007 A1* | 6/2009 | Keeler et al. | 244/119 |
| 2009/0184201 A1* | 7/2009 | Talwar et al. | 244/119 |

FOREIGN PATENT DOCUMENTS

| | | |
|---|---|---|
| DE | 87 14 732.7 | 4/1989 |
| FR | 2 915 176 | 10/2008 |
| GB | 2435457 A * | 8/2007 |

OTHER PUBLICATIONS

French Preliminary Search Report dated Mar. 30, 2010 issued in French Patent Application No. 0954918 (with translation).

* cited by examiner

*Primary Examiner* — Valentina Xavier
(74) *Attorney, Agent, or Firm* — Lorenz & Kopf, LLC (57) ABSTRACT

The following steps are performed in the method of constructing an aircraft: taking a subassembly comprising two wings that are rigidly fastened together, and fitting it to a fuselage wall; and fastening the subassembly to the wall by means of fastener elements that are distinct from the subassembly and that present main axes that are vertical.

14 Claims, 6 Drawing Sheets

METHOD OF CONSTRUCTING A FIXED-WING AIRCRAFT

FIELD OF THE INVENTION

The invention relates to the structure of aircraft, and in particular to the junction between the wing and the fuselage.

BACKGROUND OF THE INVENTION

Conventionally, an airplane comprises two wings that are connected to the fuselage via a central wing box. The function of the wing box is to take up forces coming from the wings and to transmit them to the fuselage.

The building of the central segment of the fuselage thus begins by constructing the central wing box around which the skin elements and the frames constituting the fuselage are added. The box has horizontal top and bottom panels. Each wing has a lateral wing box via which it is fastened to the central box. These lateral boxes also present top and bottom panels. Each top panel of the wings is connected to the top panel of the central box by means of a part that is referred to as a cross or as being cruciform, given the characteristic shape of its section. The same part is also used for connecting the fuselage skin to the central and lateral boxes. Stiffeners of the two panels are also fastened to one another by means of compression fittings.

Unfortunately, the number of parts needed for assembling the wings to the fuselage is relatively high. These operations take place on the final assembly line and they present a duration that is penalizing. In particular, since the box is initially connected to the fuselage, the wings are fastened to the lateral walls of the box, referred to as ribs. This fastening operation is very awkward, given its duration and the number of parts to be assembled together. One of the major lines of present-day research lies in simplifying this junction zone and in redesigning the way in which airplanes are constructed and assembled.

OBJECT AND SUMMARY OF THE INVENTION

An object of the invention is to simplify assembling the wings to the fuselage, in particular in order to reduce the time taken.

To this end, the invention provides a method of constructing an aircraft, the method comprising the following steps:
 taking a subassembly comprising two wings that are rigidly fastened together, and fitting it to a fuselage wall; and
 fastening the subassembly to the wall by means of fastener elements that are distinct from the subassembly and that present main axes that are vertical.

Thus, the subassembly comprising the two wings can be made away from the final assembly line for the airplane, which is advantageous insofar as the operations concerned are expensive in terms of assembly time, whereas joining the subassembly to the fuselage takes place on the final assembly line in a manner that is simple and using a small number of parts. Furthermore, the vertical arrangement of the fastener members enables the subassembly to be connected to the fuselage in simple manner. This reduces the time required for assembly and the number of parts that are used.

Advantageously, the wall carries at least one fitting prior to the subassembly being fitted thereto, and the subassembly is fastened to the wall in such a manner that the fastener members pass through the fitting or at least one of the fittings.

Thus, each fitting may be fastened to the wall away from the final assembly line, and prior to assembling the subassembly to the fuselage. Furthermore, it is the fitting that directly withstands the stresses generated by fastening to the subassembly, and not the wall itself, with the forces subsequently being transmitted to the wall.

Advantageously, the subassembly comprises a side wall connecting together the top and bottom panels of the wing, and the subassembly is fastened to the fuselage wall in such a manner that the fastener members pass through the side wall. In an implementation, the subassembly comprises a central wing box, and for each wing at least one splice plate connecting the wing to the box, and the subassembly is fastened to the fuselage wall in such a manner that the fastener members pass through the splice plate or at least one of the splice plates.

The splice plate or at least one of the splice plates preferably presents at least one extra thickness in the vertical direction in a zone through which the fastener members pass.

This makes the splice plate more robust in this zone.

In another implementation, the subassembly includes at least one main wing panel in the form of a single part common to both wings.

This further reduces the number of assembly operations.

Advantageously, the fuselage wall is made of a composite material.

It should nevertheless be understood that the invention may also be applied if the fuselage wall is made of a metal material.

Preferably, at least one of the fastener members includes a pre-stressed washer.

This ensures that the fastener member is properly tensioned.

The invention also provides an aircraft that comprises:
 a subassembly comprising two wings that are rigidly fastened together; and
 a fuselage wall fastened to the subassembly by means of fastener members that are distinct from the subassembly, and that present main axes that are vertical.

Preferably, each fastener member comprises a fastener bolt and a nut, the wall carrying at least one fitting presenting a vertical orifice occupied by the fastener bolt and a transverse orifice occupied by the nut.

Advantageously, the subassembly has a lateral wall made of aluminum connecting the top and bottom wing panels together.

The invention also provides an aircraft subassembly that comprises two wings rigidly fastened together independently of any fuselage wall, the subassembly including housings opening out into the top portion of the subassembly at a proximal end of each wing and extending vertically.

Advantageously, the subassembly includes a central wing box and, for each wing, at least one splice plate fastened to the wing and to the box by means of fastener elements extending between the stiffeners of the wing and of the box.

Preferably, the fastener elements form rows that are parallel to the stiffeners, the fastener elements extending in register with spaces between pairs of rows of fastener elements, preferably not being separated by a stiffener.

The invention also provides a fuselage wall and at least one fitting carried by the wall at a bottom edge of the wall and presenting a housing opening out in the bottom portion of the fitting and extending vertically.

The wall preferably carries two fittings extending on either side of the wall and fastened to each other in a zone of mutual contact.

BRIEF DESCRIPTION OF THE DRAWINGS

Other characteristics and advantages of the invention appear further from the following description of two embodiments given as non-limiting examples with reference to the accompanying drawings, in which:

FIG. 2 comprises four perspective views showing respective steps in the method of assembling the FIG. 1 airplane;

MORE DETAILED DESCRIPTION

Figures 1, 2A, 2B, 2C, 2D:
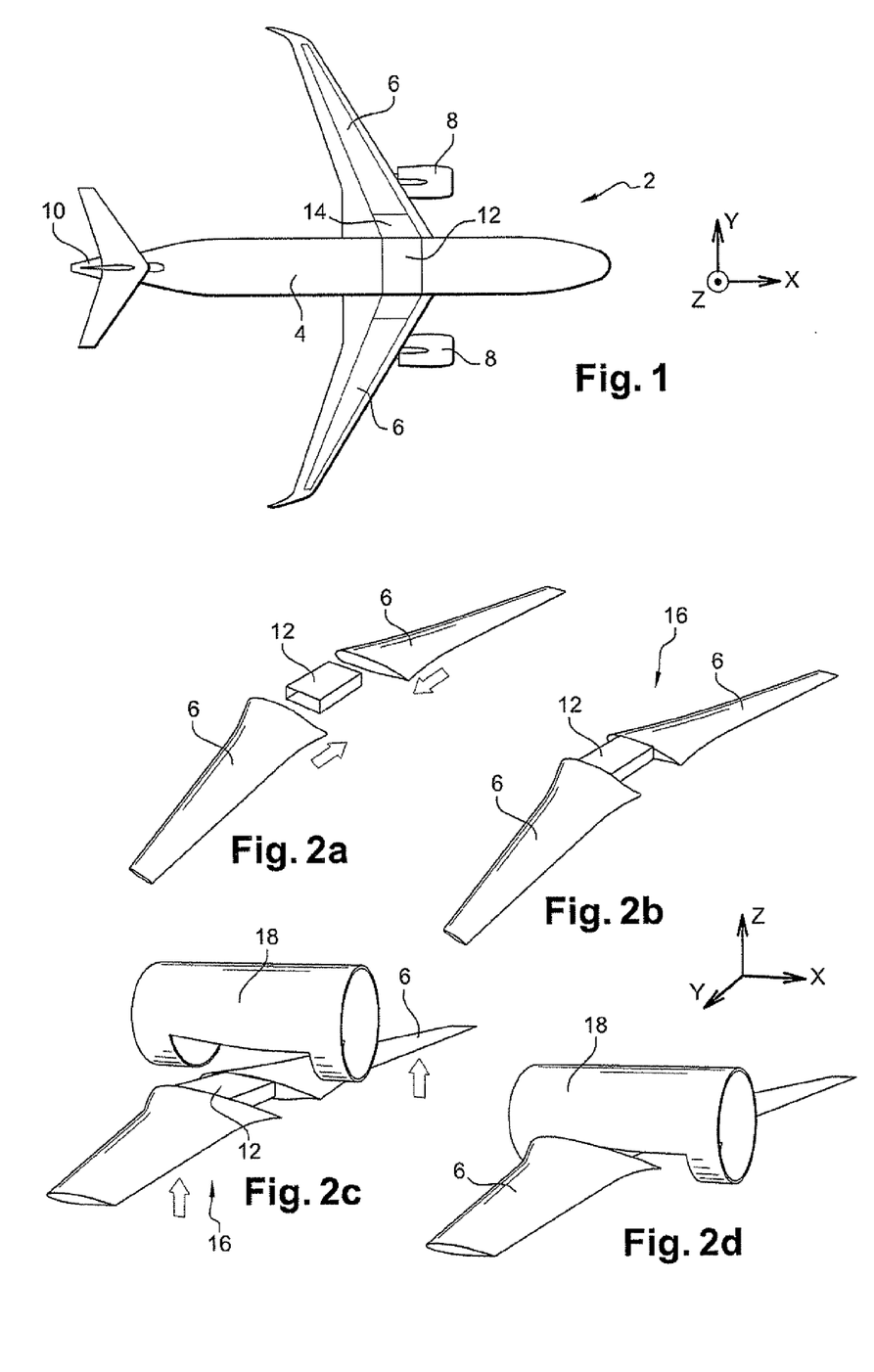
FIG. 1 is a plan view of an airplane of the invention.

In the embodiment shown in FIG. 1, the aircraft of the invention is an aerodyne, and specifically an airplane 2. It comprises a fuselage 4, two wings 6, each carrying an engine 8, a tail 10, and a central wing box 12. The wing box is generally in the form of a rectangular parallelepiped. Each of the wings 6 includes at its proximal end adjacent to the fuselage a respective lateral wing box 14. The wings are fastened to the fuselage via the lateral boxes that are fastened to the central box 12. Below, the conventional X, Y, Z frame of reference is used in which the direction X is horizontal and parallel to the flying direction of the airplane, the direction Y is horizontal and perpendicular to the direction X, while the direction Z is vertical. Over the major fraction of its length, the fuselage is in the form of a tapering cylinder of generally circular cross-section with its axis parallel to the direction X.

The airplane shown is a commercial airliner. It is suitable for transporting passengers and/or goods, and in particular it complies with the regulations applicable for that purpose. At the front end of the fuselage it has a cockpit suitable for being occupied by one or more human operators forming at least part of the crew of the airplane. The fuselage also includes a cabin and one or more holds that are pressurized. The airplane is designed to fly at the conventional altitude for short-, medium-, and long-distance flights, and in particular at altitudes greater than 10,000 feet ('), 20,000', or 30,000'. Specifically, the aircraft is neither a drone nor a scale model, nor a mock-up.

FIG. 2 shows the principles of the construction method of the invention in a first implementation, in the form of four steps 2a, 2b, 2c, and 2d.

In the first step 2a, the wings 6 are brought into register with the side faces of the central wing box 12 to which they are to be fastened. In the second step 2b, the wings 6 are fastened to the central box 12. This produces a subassembly 16 in which the wings are rigidly fastened to each other independently of any part of the fuselage.

In FIG. 2c, the subassembly 16 is placed vertically below a central segment 18 of the fuselage that is to receive the box 12. A housing is provided in the bottom portion of the segment by cutting the segment out so as to enable the box to extend within the segment.

The subassembly is moved up to the segment 18 in the vertical direction. In step 2d, the subassembly 16 is rigidly fastened to the fuselage segment.

The assembly operations shown in FIGS. 2a and 2b are preferably performed on an assembly line other than the main assembly line of the airplane, where the steps of FIGS. 2c and 2d are performed. The operations of FIGS. 2a and 2b may, for example, be performed at a major component assembly (MCA) stage. The operations of FIGS. 2c and 2d, i.e. making the final junction, take place on the final assembly line (FAL).

As can be seen, in the invention, the central wing box 12 is no longer a portion of a fuselage subassembly, but rather a portion of the wing subassembly 16.

The structure of the airplane that enables such assembly operations to be performed is described below in greater detail.

Figure 3:
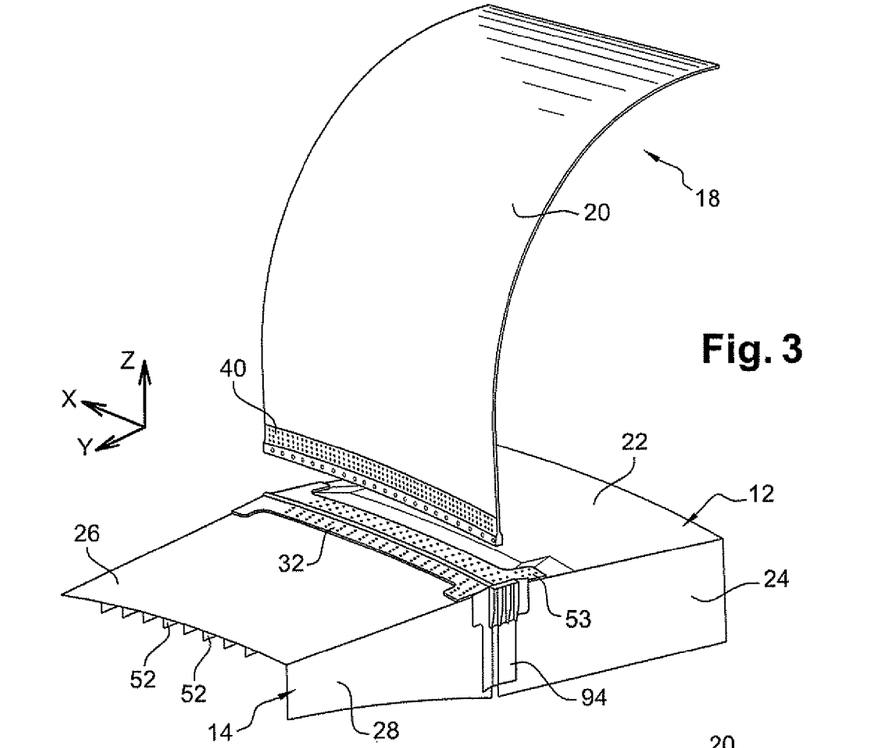
FIGS. 3 and 4 are perspective views of a portion of the fuselage, of the central box, and of one of the lateral boxes of the FIG. 1 airplane, respectively before and after the fuselage has been fastened to the boxes.
Figure 4:
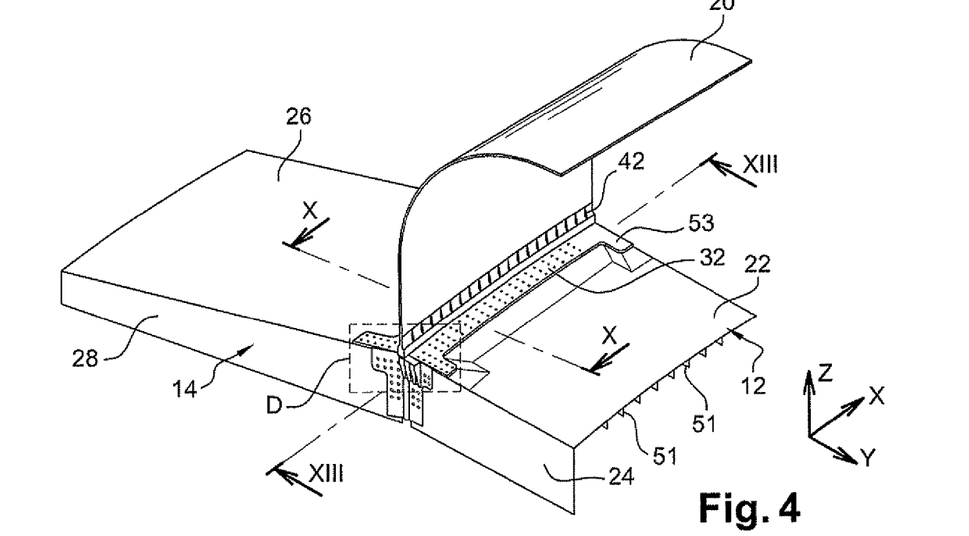

FIGS. 3 and 4 show the wall or the skin 20 of the segment 18, the respective top panels 22 and 26 of the central box 12 and of the lateral box 14 of a wing, and the spars 24 and 28 of the central box 12 and of the lateral box 14 of the wing. FIG. 3 shows the subassembly and the segment in the situation shown in FIG. 2c, while FIG. 4 shows them in the situation shown in FIG. 2d.

Each top panel 22 and 26 is generally plane in shape and extends horizontally. A major fraction of the spar 24 extends perpendicularly to the direction X. A major fraction of the spar 28 extends vertically, parallel to the direction Z, but is inclined relative to the direction. Y.

Figure 10:
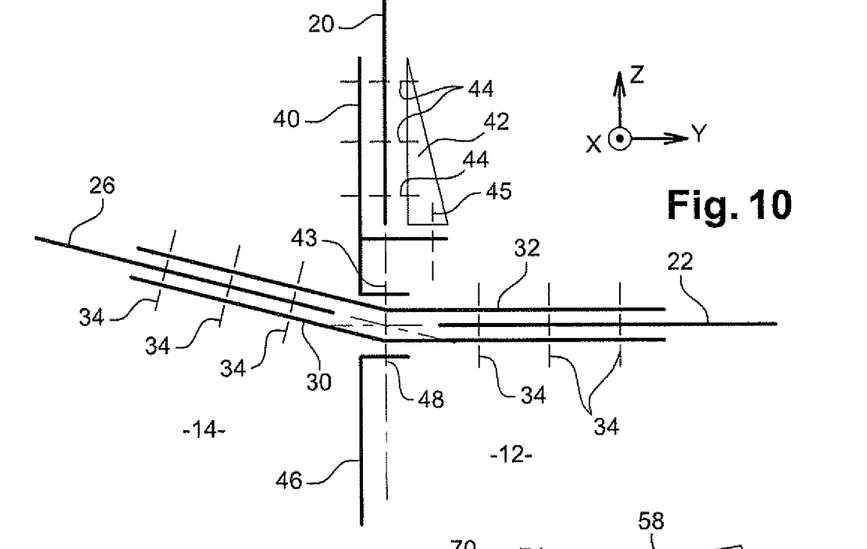
FIGS. 10 and 11 are respectively a main view and a detail view in section on plane X-X of the parts of FIG. 4.

FIG. 10 shows the principle on which the parts are arranged. For each wing 6, the airplane has a splice plate 30 and a backing splice plate 32 that sandwich between them firstly the top panel 22 of the central box and secondly the top panel 26 of the wing box, at the proximal end thereof. Fastener elements 34 working in shear are provided to fasten each of the splice plate and backing splice plate firstly to the panel 22 and secondly to the panel 26. Each of the shear elements 34 thus passes through one of the panels and both the splice plate 30 and the backing splice plate 32. These elements extend in the vertical direction when they are associated with the panel 22 and in a direction that is close to the vertical when they are associated with the panel 26.

At its bottom end, the wall 20 carries a fitting 40 and a backing fitting 42 that sandwich between them the bottom end zone of the wall together with its bottom edge. Fastener elements 44 pass through the wall and through both the fitting and the backing fitting in order to fasten these three parts rigidly together, and these fastener elements extend in the direction Y.

The central wing box 12 has a side wall or rib 46 extending mainly in a plane perpendicular to the direction Y. At its top it presents a horizontal flange as does the bottom of the fitting 40. The splice plate 30 and the backing splice plate 32 are sandwiched between these flanges that project into the fuselage. This stack of four layers is assembled and rigidly fastened together by means of fastener members 48 presenting a main axis 43 that extends in the direction Z.

These various parts are described below in greater detail.

Figures 6, 7:
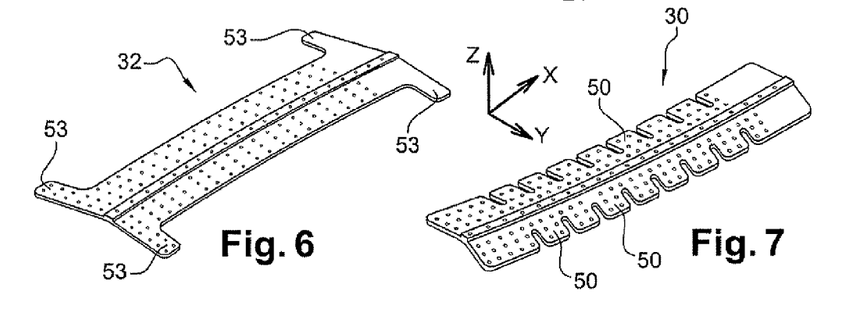
FIGS. 6 and 7 are perspective views of splice plates connecting the central and lateral boxes in the preceding figures.

The splice plates 30 and 32 are shown respectively in FIGS. 7 and 6. Each is essentially plane and flat in shape such that their dimensions in the direction Z are much less than their dimensions in the other two directions. Each splice plate is elongate in the direction X. Nevertheless, in order to accommodate the difference in inclination relative to the horizontal between the panels 22 and 25, each of the splice plates presents a profile in the form of two segments that slope relative to each other. For example, in plan view, the splice plate 30 is generally rectangular in shape. Nevertheless, it presents cutouts or notches that extend in the direction Y or in a direction close thereto, and that extend from its longitudinal edges to about halfway towards its middle axis, so as to define fingers 50.

The backing splice plate 32 does not have any such cutouts. It is generally rectangular in shape and is extended by four tabs 53 that are likewise rectangular in shape and that lie in the plane of the backing splice plate, projecting in the direction Y from the ends thereof so that each of its ends is T-shaped.

Figure 11:
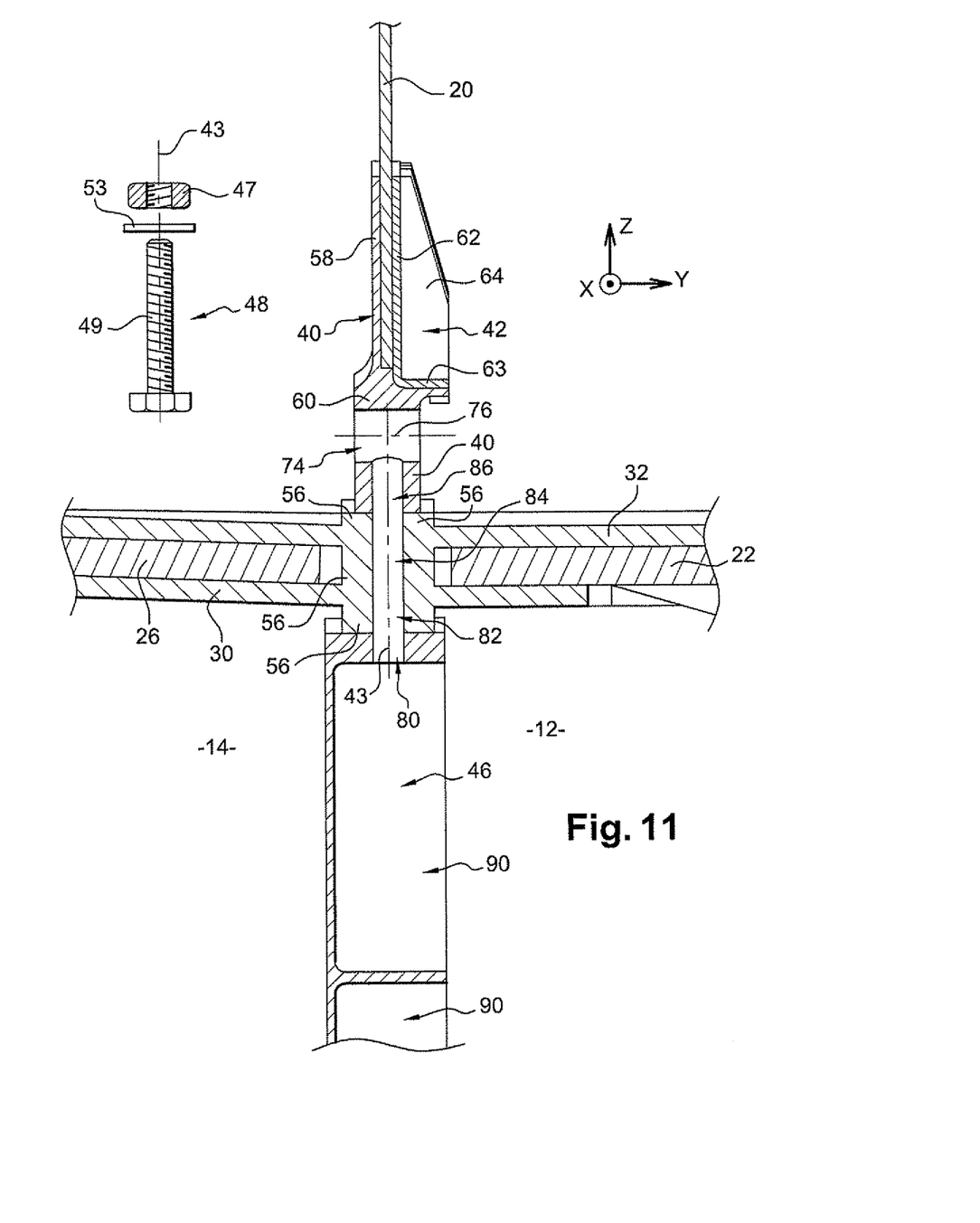

The splice plate 30 and the backing splice plate 32 are superposed one on the other, as shown in FIGS. 10 and 11. The central longitudinal halves of the splice plate and of the backing splice plate sandwich between them the panel 22 of the central box, the term "central" being used herein since said halves are adjacent to the central box. The lateral longitudinal halves of the splice plate and of the backing splice plate sandwich between them the panel 26 of the lateral box. In this arrangement, the edges of the panels 22 and 26 are spaced apart from each other, the splice plate and the backing splice plate facing each other and being in contact with each other vertically in register with the fitting 40 and the rib 46. The neutral axis of the panel 22 and the neutral axis of the panel 25, lying in the thicknesses thereof, have a point of intersection on the axis 43 of the fastener members 48.

Figure 14:
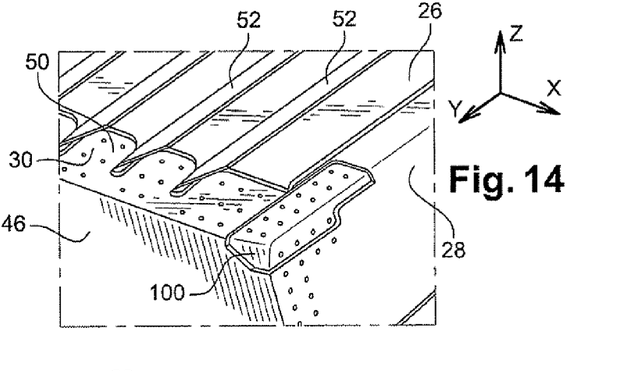
FIGS. 14 and 15 are fragmentary perspective views from below of the parts of FIG. 4.
Figure 15:
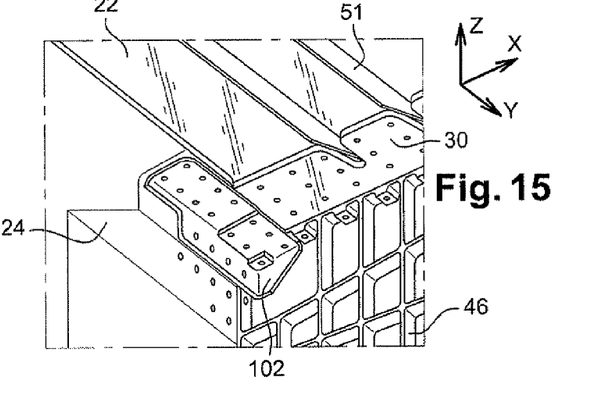

The panel 22 presents stiffeners 51 projecting from its bottom face, as shown in FIG. 15. The stiffeners form ribs, each presenting a plane shape parallel to the directions Y and Z. The ribs are parallel to one another, they face one another, and they are spaced apart from one another. The panel 26, as shown in FIG. 14, presents stiffeners 52 that are similar in shape and arrangement and that likewise extend from the bottom face of the panel. The cutouts formed in the splice plate 30 serve to receive the chamfered ends of these stiffeners.

Figure 8:
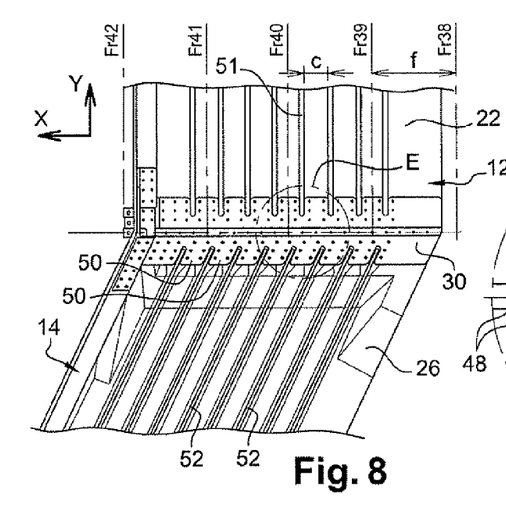
FIG. 8 is a fragmentary perspective view showing the arrangement of the fastener means on the parts of FIG. 4.

The fuselage includes frames (not shown in detail) that serve in particular to support the fuselage wall 20. These frames are mutually identical, each presenting a shape that is generally that of a plane circle. The frames extend in mutually parallel planes, facing one another and spaced apart from one another. The locations of some of these frames Fr38, Fr39, Fr40, Fr41, and Fr42 are shown in FIG. 8. In the present example, the distance if or pitch between the neutral axes of two consecutive frames is 635 millimeters (mm). In the present example, the distance c between the neutral axes of two consecutive stiffeners 51 of the panel 22 is selected to be one-third of the pitch f, and is therefore equal to 212 mm. Naturally, some other ratio could be chosen for the values c and f, and similarly different absolute values could be given to these two magnitudes.

Figure 9:
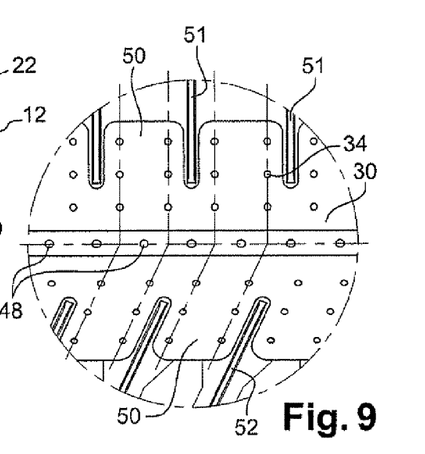
FIG. 9 is a view on a larger scale of detail E in FIG. 8.

With reference to FIGS. 9 and 11, the fastener members 48 passing through the splice plate 30 and the backing splice plate 32 to connect together the rib 46 and the fitting 40 are constituted in this example by traction fasteners in the form of nut-and-bolt assemblies. These fasteners 48 and the orifices in the splice plate 30 for receiving them are in alignment along the vertical midplane of the splice plate. Some of the fasteners extend in register with stiffeners 51, 52, being in line therewith. Other fasteners extend halfway between them. The fasteners thus alternate between being in line with the stiffeners and in register with the gaps between them. Preferably, the axis 43 of each fastener passes via the intersection between the middle axes of the panels 22 and 26.

The fastener elements 34 used for connecting together the splice plate 30, the backing splice plate 32, and the panel 22 are arranged in row that are parallel to the direction Y, each row in this example having three fastener elements 34. In the present example, two rows are provided between two consecutive stiffeners 51, 52. There are thus six fastener elements in all that extend between two consecutive stiffeners. In this way, each of the traction fasteners 48 is positioned in register with the space left empty between two consecutive rows of fastener elements 34. This serves to minimize the zone of excess stress associated with traction fasteners. Under such conditions, it can be seen that an even number of rows of fastener elements 34 is provided between two consecutive stiffeners 51, 52.

In the present example, the splice plate 30 and the backing splice plate 32 are made of pre-impregnated thermosetting plastics material. By way of example, this may be a composite material with carbon fiber reinforcement known as carbon fiber reinforced plastic (CFRP). During fabrication, the layers of plastics material forming these parts are draped on tooling that serves to form the parts that are to be made.

While these parts are being fabricated, additional plies are placed in the midplanes of these parts so as to form top and bottom extra thicknesses 56 at this location. Between the splice plate 30 and the backing splice plate 32, these extra thicknesses in the direction Z are for the purpose of enabling these two parts to bear mutually directly against each other in register with the edge faces of the panels 22 and 26. The idea is to compensate for the thicknesses of the panels 22 and 26. Outside the stack, these extra thicknesses serve to enable the splice plates to bear downwards on the rib 46 and upwards against the fitting 40. These extra thicknesses are designed to be machined so as to accommodate any dimensional tolerance problems and so that contact can be established between all of these parts in suitable manner. These layers are thus partially sacrificial. These extra thicknesses are made of fiberglass-reinforced plastics material since they are not designed to bear loads but only to be machined.

With reference to FIG. 11, the fitting 40 has a vertical bearing wall 58 with a plane face that is perpendicular to the direction Y. The fitting also has a base 60 extending under the bearing wall. The backing fitting 42 also presents a bearing wall 62 that is plane and perpendicular to the direction Y. The backing fitting has a base 63 that is plane in shape and perpendicular to the direction Z, together with plane braces 64 perpendicular to the direction X and bearing against the base 63 and the bearing wall 62. The wall 20 of the fuselage is sandwiched in the Y direction between the bearing walls 58 and 62.

Figure 12:
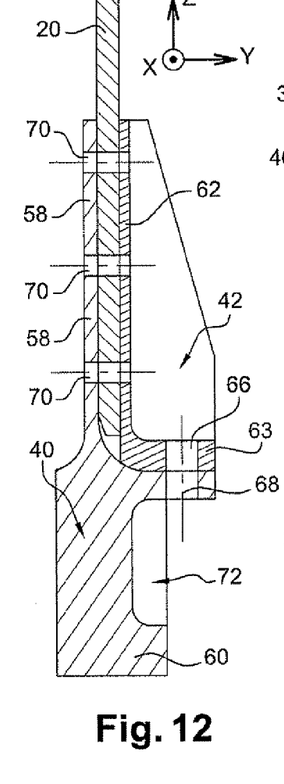
FIG. 12 is a section view analogous to FIG. 11 in a plane parallel to the section view thereof and showing the fittings of the fuselage wall.

The base 63 bears in the vertical direction against the base 60. As shown in FIGS. 10 and 12, axially-aligned orifices 66 and 68 presenting a vertical axis are formed respectively in the base 60 and 63 to receive a fastener element 45. This enables the backing fitting 42 to be fastened rigidly to the fitting 40 in a direct contact zone. The orifices 66 form a single row in the direction X, as can be seen in particular in FIG. 5. The base 60 of the fitting 40 presents, facing the orifice 68, a setback 72 that enables the fastener elements 45 to be put into place.

Furthermore, the bearing walls 58 and 62 present orifices 70 that coincide with the orifices of the wall 20 in order to fasten these parts rigidly together. The orifices 70 receiving the fastener elements 44 are disposed in vertical rows following one another in the direction X. This arrangement constitutes a fastening with two shear planes. The wall 20 thus carries the fitting 40 and the backing fitting 42 fastened together directly and via the bottom edge of the wall.

The fitting 40 and the backing fitting 42 are preferably made of metal. Otherwise, they may be made of composite material.

Figure 13:
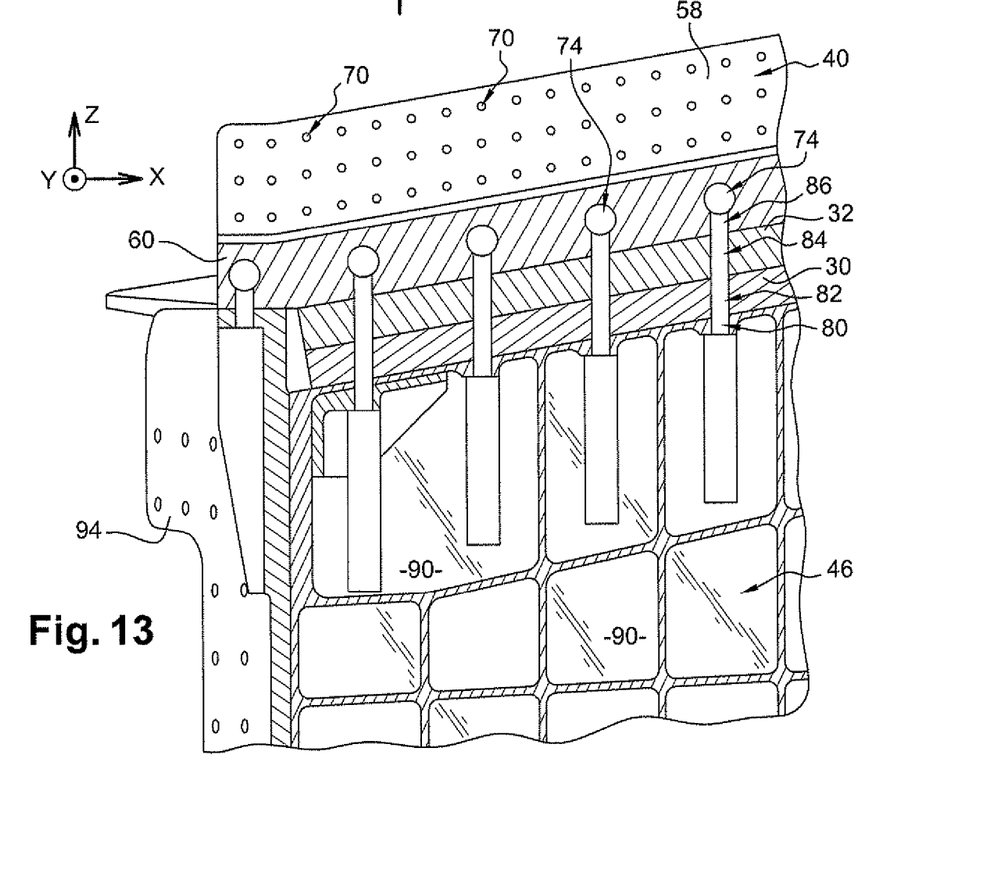
FIG. 13 is a section view on plane XIII-XIII of the parts of FIG. 4.

With reference to FIG. 11, the base 60 presents orifices 74 having an axis 76 parallel to the direction Y and opening out on both sides of the base. As shown in FIG. 13, these orifices are of profiled shape, having a circular section in a plane perpendicular to the direction Y. Each of them is designed to receive a nut of the associated traction fastener 48.

The rib 46, the splice plate 30, the backing splice plate 32, and the base 60 also have axially-aligned orifices 80, 82, 84, and 86 that extend continuously one in line with another, in that order going upwards. The orifice 80 opens out into the top wall of the rib through which it passes, while the orifice 86 in the base opens out into the orifice 74. The orifices 82 and 84 extend within the extra thicknesses of the splice plate and the backing splice plate.

In order to fasten the rib 46, the splice plate 30, the backing splice plate 32, and the fitting 40 together by means of a traction fastener 48, the bolt 49 of the fastener is inserted in the orifice 80 from the rib 46 and pushed up through the orifices 82, 84, and 86. A nut 47 is placed in the orifice 74 by being inserted sideways. The bolt is then screwed into the nut. A pre-loading washer 53 may be provided adjacent to the head of the fastener in order to establish proper pre-tension.

Thus, the subassembly 16 is fastened to the wall 20 in such a manner that the fastener members 48 pass through the fittings 40, 42, the rib 46, and the splice plates 30, 32, these members being distinct from the box 12, the wings 6, and other fastener parts.

Preferably, the wall 20 forming the skin of the fuselage is also made of a thermosetting pre-impregnated plastics material, e.g. of the CFRP type. The various plies are advantageously arranged by automatically draping sheets.

The fastener elements 34 for fastening the skin 20 to the fitting 40 and to the backing fitting 42 may, for example, be shear elements such as fasteners having a diameter of 6.35 mm.

The elements 45 providing direct fastening between the fitting and the backing fitting may be traction fasteners having a diameter of 11.1 mm. As shown in particular in FIG. 5, care is preferably taken to provide the orifices 66, 68 that receive these elements 45 halfway between respective traction fasteners 48. A flat is provided on the base of the backing fitting for the head of the fastener to bear thereagainst.

In analogous manner, a flat is provided in the bottom portion of the top wall of the rib, with the head of the fastener 48 bearing thereagainst. The diameter of the orifices 80, 82, 84, and 86 may be 19.1 mm, for example.

Figure 5:
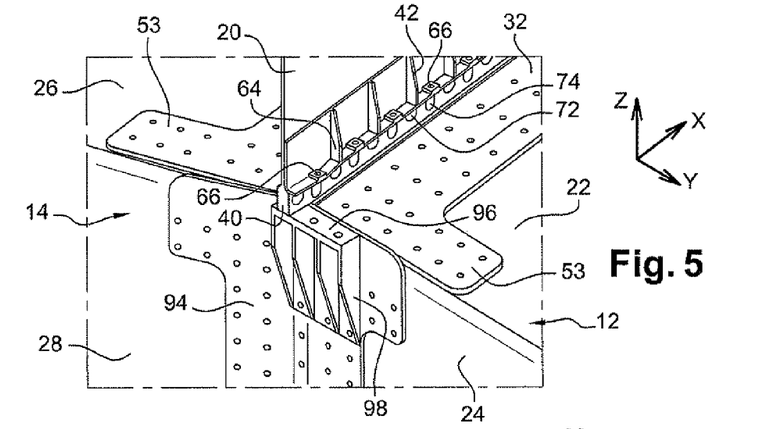
FIG. 5 is a view on a larger scale of detail D of FIG. 4.

FIG. 5 in particular shows a rear outer splice plate 94 presenting a shape that is essentially flat and extending vertically. The splice plate has area contact with the spars 28 and 24. It is connected to each of them by a plurality of fastener elements that extend in the direction X through orifices in the splice plate. In a top central zone it has a small plate 96 supported by braces 98 and presenting orifices that are vertical. By means of one of these orifices, it is rigidly fastened to the fitting 40 and to the backing fitting 42. At this location, and as can be seen in FIG. 13, the last vertical orifice 86 of the base of the fitting is occupied by a traction fastener that passes not through the splice plate 30 and the backing splice plate 32, but extends through the small plate 96. At the other ends of the splice plates 30 and 32, a front external splice plate presents a shape and an arrangement analogous to the rear external splice plate 94. The external end splice plates are preferably made of metal.

The rib 46 presents boxes 90 on its inside face that are of quadrilateral shape when seen from the right. These boxes are defined by walls that extend vertically and horizontally or in a direction that is inclined relative to the vertical direction. The top row of these boxes 90 presents a height that is sufficient to enable them to receive the bolts of the traction fasteners 48 in order to be inserted in the orifices 80, 82, 84, and 86.

FIGS. 14 and 15 show respective angle members 100 and 102. The angle member 100 extends at the junction between the spar 28, the panel 26, and the rib 46. The angle member 102 extends at the junction between the panel 22, the spar 24, and the rib 46. These angle members are rigidly fastened to the three parts with which they are in contact. They are also fastened locally to the splice plate and the backing splice plate over which they are superposed. The angle members 100 and 102 are preferably made of metal.

By means of this assembly, it is possible to implement the assembly method having the following features. Initially the central box 12 is pre-assembled to the lateral boxes 14 in order to form the subassembly 16. The fitting 40 and the backing fitting 42 are also mounted on the fuselage skin 20 on both sides of the fuselage. Thereafter, the subassembly 16 is brought under the fuselage 18 and is moved vertically. Once contact is established, the subassembly and the fuselage are assembled together by means of the fasteners 48. This avoids having different support planes and numerous rows of fasteners in the final assembly line. Furthermore, the front and rear frames Fr38 and Fr42 are fastened at the same time to the front and rear outer splice plates.

It can thus be seen that it is no longer a single part that is fastened directly both to the wall 20 of the fuselage and to the rib 46 and also to the panels 22 and 26 of the lateral and central boxes. An arrangement is provided that the person skilled in the art sometimes refers as to an "upright piano".

Preferably, the rib 46 is machined out of aluminum. This selection is determined by the saving in weight and the reduction in assembly time made possible by the method of the invention.

Figures 16, 17:
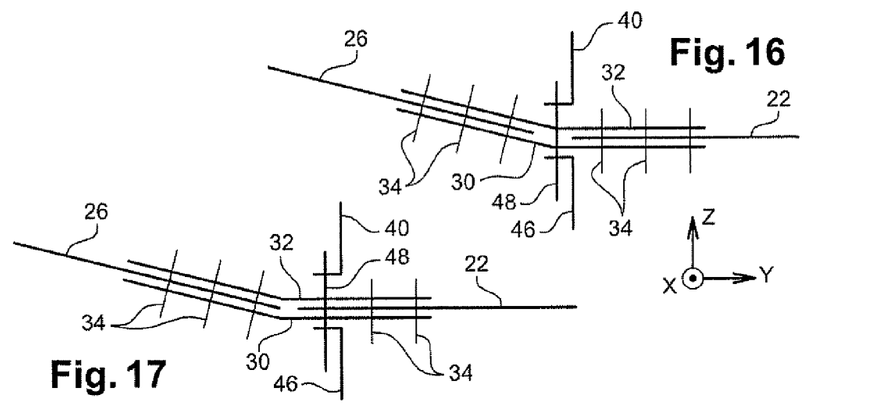
FIGS. 16 and 17 are views analogous to FIG. 10 showing variant embodiments.

FIGS. 16 and 17 show variant embodiments.

In FIG. 16, the flange of the rib 46 faces towards the wing and no longer towards the fuselage. The same applies to the base of the fitting 40.

In the variant of FIG. 17, the traction fasteners 48 pass through one of the panels 22 and 26, e.g. the panel 22 of the central wing box. Thus, the axes of the fasteners do not pass through the intersection of the neutral axes of the panels 22 and 26. However, the fasteners are also used as shear fasteners for retaining the panel 22.

In another embodiment, provision may be made for the central wing box no longer to exist as a part that is originally independent of the wing. Under such circumstances, a main top wing panel is provided as a single piece that goes from one wing tip to the other, i.e. from the left-hand end of the left wing to the right-hand end of the right wing. This panel thus replaces the panels 26 and 22. The wing has a one-piece main bottom panel that is constituted in analogous manner.

During assembly, ribs (comparable to the side walls 46 of the box in the embodiment of FIG. 3) are interposed between these two splice plates so as to connect the top and bottom panels together and constitute a one-piece wing. This thus produces a subassembly made up of both wings rigidly fastened to each other, independently of any fuselage wall.

A fuselage wall is fitted to this subassembly as in the implementation of FIG. 3. Once more, the subassembly is fastened to the wall by means of fastener members that are distinct from the subassembly and that present a main axis that is vertical.

In this embodiment, the wing is thus made directly as shown in portion 2*b* of FIG. 2. The method then continues as shown in portions 2*c* and 2*d* of FIG. 2. The other fastener and assembly means are retained.

Naturally, numerous modifications could be made to the invention without going beyond the ambit thereof.

Furthermore, independently of the invention, provision could be made for the subassembly to comprise at least one one-piece main wing panel that is common to both wings.

The invention claimed is:

1. A method of constructing an aircraft comprising:
taking a subassembly comprising two wings and a central wing box,
connecting each wing to the central wing box with at least one splice plate,
fastening each wing and the box to the splice plate by means of shear elements,
fitting the subassembly to a wall of a fuselage, wherein the fuselage includes a recessed portion, and
after the connecting step, fastening the subassembly to the fuselage wall by means of fastener members that are distinct from the subassembly and that present main axes that are vertical in such a manner that the fastener members pass through the splice plate or at least one of the splice plates,
wherein the aircraft is not a scale model or a mock-up, and the subassembly is mounted within the recessed portion of the fuselage.

2. A method according to claim 1, wherein the subassembly comprises a side wall connecting together top and bottom panels of the wing, and the subassembly is fastened to the fuselage wall in such a manner that the fastener members pass through the side wall.

3. A method according to claim 1, wherein the wall carries at least one fitting prior to the subassembly being fitted thereto, and the subassembly is fastened to the wall in such a manner that the fastener members pass through the fitting or at least one of the fittings.

4. A method according to claim 1, wherein the subassembly includes at least one main wing panel in the form of a single part common to both wings.

5. A method according to claim 1, wherein the fuselage wall is made of a composite material.

6. An aircraft, comprising:
a subassembly comprising two wings and a central wing box, wherein each wing is connected to the central wing box with at least one splice plate such that each wing and the central wing box are rigidly fastened to the splice plate by means of shear elements, and
a fuselage wall fastened to the subassembly by means of fastener members that are distinct from the subassembly, and that present main axes that are vertical,
wherein the aircraft is not a scale model or a mock-up, and the subassembly is mounted within a recessed portion of the fuselage.

7. An aircraft according to claim 6, wherein the fastener members comprise a fastener bolt and a nut, the wall carrying at least one fitting presenting a vertical orifice occupied by the fastener bolt and a transverse orifice occupied by the nut.

8. A subassembly for an aircraft having a fuselage, wherein the subassembly comprises two wings rigidly fastened together independently of any wall of the fuselage, the subassembly including housings opening out into a top portion of the subassembly at a proximal end of each wing and extending vertically, wherein the housing are integrally distant from a wing trailing edge and wherein, after the subassembly is built, the subassembly is fastened to a wall by fastener members and is mounted within a recessed portion of the fuselage, and wherein the subassembly is not a scale model or mock-up.

9. An aircraft fuselage portion, including a fuselage wall, and at least one fitting carried by the wall at a bottom edge of the wall and presenting a housing opening out in the bottom portion of the fitting and extending vertically, the wall carrying two fittings extending on opposing faces of a same wall of the fuselage portion and the fittings are fastened to each other in a zone of mutual contact of the fittings with each other, wherein the aircraft fuselage portion is not a scale model or a mock-up.

10. A method of constructing an aircraft, the method comprising the following steps:
taking a subassembly comprising two wings that are rigidly fastened together, and fitting it to a fuselage wall; and
fastening the subassembly to the wall by means of fastener members that are distinct from the subassembly and that present main axes that are vertical,
wherein the subassembly includes housings opening out into a top portion of the subassembly at a proximal end of each wing and extending vertically,
wherein the aircraft is not a scale model or mock-up.

11. The method according to claim 10, wherein the housings are integrally distant from a wing trailing edge.

12. The method according to claim 1, wherein the subassembly is fastened directly to the wall by means of the fastener members.

13. The aircraft according to claim 6, wherein the subassembly is fastened directly to the wall by means of the fastener members.

14. The method according to claim 10, wherein the subassembly is fastened directly to the wall by means of the fastener members.

* * * * *